US009807624B2

(12) United States Patent
Tapia et al.

(10) Patent No.: US 9,807,624 B2
(45) Date of Patent: Oct. 31, 2017

(54) SELF-ADJUSTING WIRELESS IN-BAND BACKHAUL

(71) Applicant: T-Mobile USA, Inc., Bellevue, WA (US)

(72) Inventors: Pablo Tapia, Snoqualmie, WA (US); Brian Allan Olsen, Bellevue, WA (US); Hongliang Zhang, Samammish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/919,674

(22) Filed: Oct. 21, 2015

(65) Prior Publication Data
US 2016/0353401 A1 Dec. 1, 2016

Related U.S. Application Data

(60) Provisional application No. 62/169,510, filed on Jun. 1, 2015.

(51) Int. Cl.
H04B 3/36 (2006.01)
H04B 7/14 (2006.01)
H01Q 3/00 (2006.01)
H04W 24/02 (2009.01)
H04W 84/04 (2009.01)
H04W 92/12 (2009.01)
H04W 92/20 (2009.01)

(52) U.S. Cl.
CPC .......... H04W 24/02 (2013.01); H04W 84/045 (2013.01); H04W 92/12 (2013.01); H04W 92/20 (2013.01)

(58) Field of Classification Search
CPC .... H04W 60/04; H04W 60/06; H04L 65/607; H04L 65/1069; H04L 43/16
USPC ....................................................... 455/435.1
See application file for complete search history.

(56) References Cited

U.S. PATENT DOCUMENTS

2003/0228857 A1* 12/2003 Maeki .................... H01Q 1/246
455/278.1
2004/0174298 A1* 9/2004 Eriksson ................ H01Q 1/246
342/359
2007/0258417 A1* 11/2007 Harvey ................. H04W 16/14
370/338

(Continued)

Primary Examiner — Rafael Pérez-Gutiérrez
Assistant Examiner — Mark G. Pannell
(74) Attorney, Agent, or Firm — Han Santos, PLLC; Elliott Y. Chen

(57) ABSTRACT

A communication cell may use a wireless in-band backhaul to route backhaul traffic to a macrocell of a carrier network such that the backhaul traffic is delivered to a core network of the carrier network. The communication cell may route backhaul traffic of user devices via the wireless in-band backhaul between the communication cell and the macrocell. The wireless in-band backhaul may take place of a dedicated backhaul between the communication cell and the core network. As the backhaul traffic is routed, if a characteristic of the wireless communication between the communication cell and the macrocell fails to meet a threshold, an antenna of the communication cell may be electrically or mechanically adjusted to improve the characteristic of the wireless communication. The adjustment of the antenna includes performing a beam forming or moving one or more antenna elements of the antenna.

20 Claims, 7 Drawing Sheets

(56) References Cited

U.S. PATENT DOCUMENTS

| | | | | |
|---|---|---|---|---|
| 2010/0302946 | A1* | 12/2010 | Yang | H04B 7/155 370/235 |
| 2011/0222399 | A1* | 9/2011 | Shi | H04W 28/18 370/230 |
| 2012/0315908 | A1* | 12/2012 | Li | H04W 36/0083 455/436 |
| 2013/0201966 | A1* | 8/2013 | Weng | H04W 72/04 370/336 |
| 2013/0244664 | A1* | 9/2013 | Song | H04W 36/0083 455/437 |
| 2013/0303230 | A1* | 11/2013 | Sayana | H04W 24/08 455/524 |
| 2014/0099881 | A1* | 4/2014 | Boudreau | H04B 7/14 455/7 |
| 2014/0286337 | A1* | 9/2014 | Dolson | H04L 43/12 370/392 |
| 2014/0313080 | A1* | 10/2014 | Smith | H01Q 3/00 342/372 |
| 2016/0100423 | A1* | 4/2016 | Pengoria | H04B 7/024 370/329 |

\* cited by examiner

SELF-ADJUSTING WIRELESS IN-BAND BACKHAUL

CROSS REFERENCE TO RELATED PATENT APPLICATION

This application claims priority to U.S. Provisional Patent Application No. 62/169,510, filed on Jun. 1, 2015, entitled "Self-Adjusting Wireless In-Band Backhaul," which is hereby incorporated by reference in its entirety.

BACKGROUND

A wireless telecommunication carrier may deploy picocells to areas with poor cellular receptions to improve cellular coverage in these areas. For example, while macrocells may be deployed in open spaces to maximize overall cellular coverage, picocells may be deployed inside buildings, in basements, and in other isolated spaces to provide spot cellular coverage. Mobile devices may use quality of service (QoS) metrics, such as signal-to-interference plus noise ratio (SINR), to select the best communication connection. Accordingly, mobile devices may connect to a picocell when the picocell provides a more robust communication connection than a macrocell. However, the deployment of the picocells involves connecting each cell to the core network or to a macrocell using either existing wired infrastructure, new wired infrastructure, or a combination of such infrastructures. Such hard wiring may be relatively costly to install, service, and maintain as picocells are designed to provide cellular coverage to limited areas.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
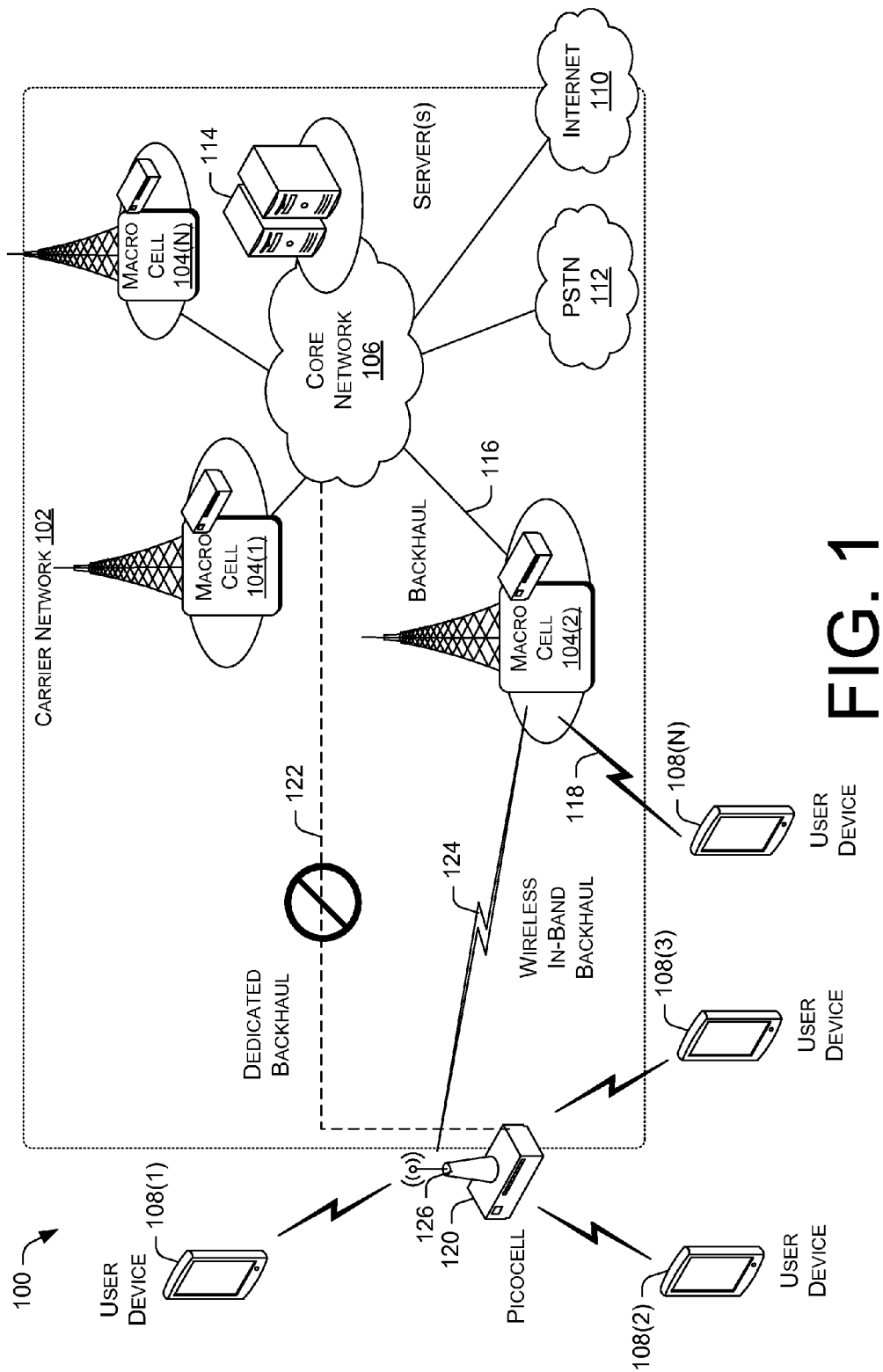
FIG. 1 illustrates an example network architecture for implementing self-adjusting wireless in-band backhaul.

This disclosure is directed to techniques for deploying a picocell without having to implement a dedicated backhaul connection between the picocell and a core network of a wireless telecommunication carrier, and without having to provide a wired backhaul connection between the picocell and a macrocell of the wireless telecommunication carrier. A backhaul is a network infrastructure that transports cellular communication traffic between cells and the core network of the wireless telecommunication carrier. Instead, the picocell may leverage a macrocell located in the vicinity of the picocell that is deployed with a backhaul to the core network. The picocell may establish a wireless in-band "bridging" backhaul to such a macrocell. The wireless in-band "bridging" backhaul is used by the picocell to route backhaul traffic to the macrocell. In turn, the macrocell may route the backhaul traffic of the picocell to the core network on behalf of the picocell. In other words, a picocell may essentially borrow the backhaul connection of the macrocell to the core network to communicate with the core network, without having to implement any similar connection of its own.

The wireless in-band "bridging" backhaul between the picocell and the macrocell does not hinder the ability of the macrocell to handle cellular communication traffic from user devices that are directly connected to the macrocell 104(2) via an air interface. This is because the backhaul data traffic between the picocell and the macrocell may be communicated via selectively scheduled portions of physical resource blocks (PRBs) of the air interface that carry the cellular communication traffic. The use of the selectively scheduled portions of the PRBs to prevent hindrance constitutes the "in-band" aspect of the wireless backhaul. The air interface may be based on Universal Mobile Telecommunications Systems (UMTS), High Speed Packet Access (HSPA), Long Term Evolution (LTE), and LTE-Advanced network technologies. In other words, the picocell and the macrocell may use the coordinated scheduling to ensure that the macrocell has time to handle communication with the user devices that interface with the picocell, as well as user devices that directly interface with the macrocell.

In some instances, as the picocell routes backhaul traffic to the macrocell via the wireless in-band backhaul, the picocell may monitor one or more characteristics of the wireless in-band backhaul. Accordingly, the picocell may perform adjustments to an antenna of the picocell in order re-orient the antenna of the picocell in relation to the macrocell. Such adjustments may maximize the data carrying capabilities of the wireless in-band backhaul. In various embodiments, the adjustment of the antenna may be performed via electrical beam forming and/or via mechanical movements of one or more elements of the antenna.

In at least one embodiment, a picocell may use a wireless in-band backhaul established between the picocell and the macrocell to route backhaul traffic to the macrocell of a carrier network. In turn, the macrocell may deliver the backhaul traffic to a core network of the carrier network. The wireless in-band backhaul may take place of a dedicated backhaul between the picocell and the core network. As the backhaul traffic is routed, if a characteristic of the wireless communication between the picocell and the macrocell fails to meet a threshold, an antenna of the picocell may be electrically or mechanically adjusted to improve the characteristic of the wireless communication. The adjusting of the antenna includes performing a beam forming or moving one or more antenna elements of the antenna.

The techniques may enable a wireless telecommunication carrier to deploy picocells to isolated spaces such as the inside of buildings, basements, and other areas without having to provide dedicated backhaul connections between the picocells and the core network of the wireless telecommunication carrier. Thus, the use of the wireless in-band backhaul may enable the wireless telecommunication carrier to reduce the costs associated with the deployment, service, and maintenance of picocells. The techniques described herein may be implemented in a number of ways. Example implementations are provided below with reference to the following figures.

Example Network Architecture

FIG. 1 illustrates an example network architecture 100 for implementing self-adjusting wireless in-band backhaul. The network architecture 100 may include a carrier network 102 that is provided by a wireless telecommunication carrier. The carrier network 102 may include macrocells 104(1)-104(N) and a core network 106. Each macrocell may be a base station node. The carrier network 102 may provide telecommunication and data communication in accordance with one or more technical standards, such as Enhanced Data Rates for GSM Evolution (EDGE), Wideband Code Division Multiple Access (W-CDMA), HSPA, LTE, LTE-Advanced, CDMA-2000 (Code Division Multiple Access 2000), and/or so forth.

The macrocells 104(1)-104(N) are responsible handling voice and data traffic between user devices, such as user devices 108(1)-108(N), and the core network 106. Each of the macrocells 104(1)-104(N) may be communicatively connected to the core network 106 via a corresponding backhaul. Each of the backhauls may be implemented using copper cables, fiber optic cables, microwave radio transceivers, and/or so forth. For example, the macrocell 104(2) may be communicatively connected by a backhaul 116 to the core network 106.

The core network 106 may provide telecommunication and data communication services to the user devices 108(1)-108(N). For example, the core network may connect the user devices 108(1)-108(N) to other telecommunication and data communication networks, such as the Internet 110 and the public switched telephone network (PSTN) 112. In various embodiments, the core network 106 may include one or more servers 114 that implement network components. For example, the network components may include a serving GPRS support node (SGSN) that routes voice calls to and from the PSTN 112, a Gateway GPRS Support Node (GGSN) that handles the routing of data communication between external packet switched networks and the core network 106. The network components may further include a Packet Data Network (PDN) gateway (PGW) that routes data traffic between the GGSN and the Internet 110.

Each of the user devices 108(1)-108(N) may be a smartphone, a tablet computer, an embedded computer system, or any other device that is capable of using the wireless communication services that are provided by the carrier network 102. For example, a user may use the user device 108(N) to make voice calls, send and receive text messages, and download content from the Internet 110. The user device 108(N) may be communicatively connected to the core network 106 via the macrocell 104(2). Accordingly, communication traffic between the user device 108(N) and the core network 106 may be handled by a wireless interface 118 that connects the user device 108(N) to the macrocell 104(2).

The carrier network 102 may further include a picocell 120. The picocell 120 may be deployed at an isolated location, such as the inside of a building, a basement, or another isolated space where cellular signal from the macrocells 104(1)-104(N) may be partially or completed blocked. In this way, the deployed picocell 120 may provide spot cellular coverage for the carrier network 102. For example, the picocell 120 may provide cellular coverage for the user devices 108(1)-108(3). In a conventional deployment, the picocell 120 may be connected to the core network 106 via a dedicated backhaul 122. The dedicated backhaul 122 may be a wired backhaul that links the picocell 120 directly to the core network 106 or alternatively to a macrocell, such as the macrocell 104(2). The dedicated backhaul 122 may carry backhaul traffic, e.g., voice and data traffic, completely or partially between the user devices 108(1)-108(3) and the core network 106. However, the implementation, service, and maintenance of wiring infrastructure to support the dedicated backhaul 122 may be impractical or costly in some scenarios.

In such scenarios, the picocell 120 may instead wirelessly connect to a macrocell that is in the vicinity of the picocell 120. For example, the picocell 120 may form a wireless in-band backhaul 124 with the macrocell 104(2). Accordingly, the picocell 120 route backhaul traffic of the user device 108(1)-108(3) to and from the core network 106 via two backhauls portions. The first backhaul is the wireless in-band backhaul 124 formed between the picocell 120 and the macrocell 104(2). The second backhaul portion is the backhaul 116 that is between macrocell 104(2) and the core network 106.

The wireless in-band backhaul between the picocell 120 and the macrocell 104(2) does not hinder the ability of the macrocell 104(2) to handle communication traffic from user devices that are directly connected to the macrocell 104(2) via an air interface. This is because the backhaul data traffic between the picocell 120 and the macrocell 104(2) may be communicated via selectively scheduled portions of physical resource blocks of the air interface that carry the communication traffic. In other words, the picocell 120 and the macrocell 104(2) may use the coordinated scheduling to ensure that the macrocell 104(2) has time to handle communication with the user devices 108(1)-108(N) that interface with the picocell 120, as well as user devices that directly interface with the macrocell 104(2), such as the user device 108(N).

In some embodiments, the number of picocells that form wireless in-band backhauls with the macrocell 104(2) may be limited to reserve a certain bandwidth amount of the backhaul 116 for handling communication traffic of the user devices that directly interface with the macrocell 104(2). In such embodiments, a new picocell that desires to form a wireless in-band backhaul with the macrocell 104(2) may determine whether the number of the picocells that are currently using wireless in-band backhauls with the macrocell 104(2) has reached a threshold. Thus, the new picocell may form an in-band backhaul with the macrocell 104(2) when the number of picocells with current wireless in-band backhauls has not reached the threshold. Otherwise, the new picocell may be prevented from forming a wireless in-band backhaul with the macrocell 104(2).

In other embodiments, as the picocell 120 routes backhaul traffic to the macrocell 104(2) via the wireless in-band backhaul 124, the picocell may monitor one or more characteristics of the wireless in-band backhaul 124. Accordingly, the picocell 120 may perform adjustments to an antenna 126 of the picocell 120. The adjustments may orient the antenna 126 in relation to the macrocell 104(2) to maximize the data carrying capabilities of the wireless in-band backhaul 124. In such embodiments, the adjustment of the antenna 126 may be performed via electrical beam forming and/or via mechanical movements of one or more elements of the antenna 126.

Example User Device Components

Figure 2:
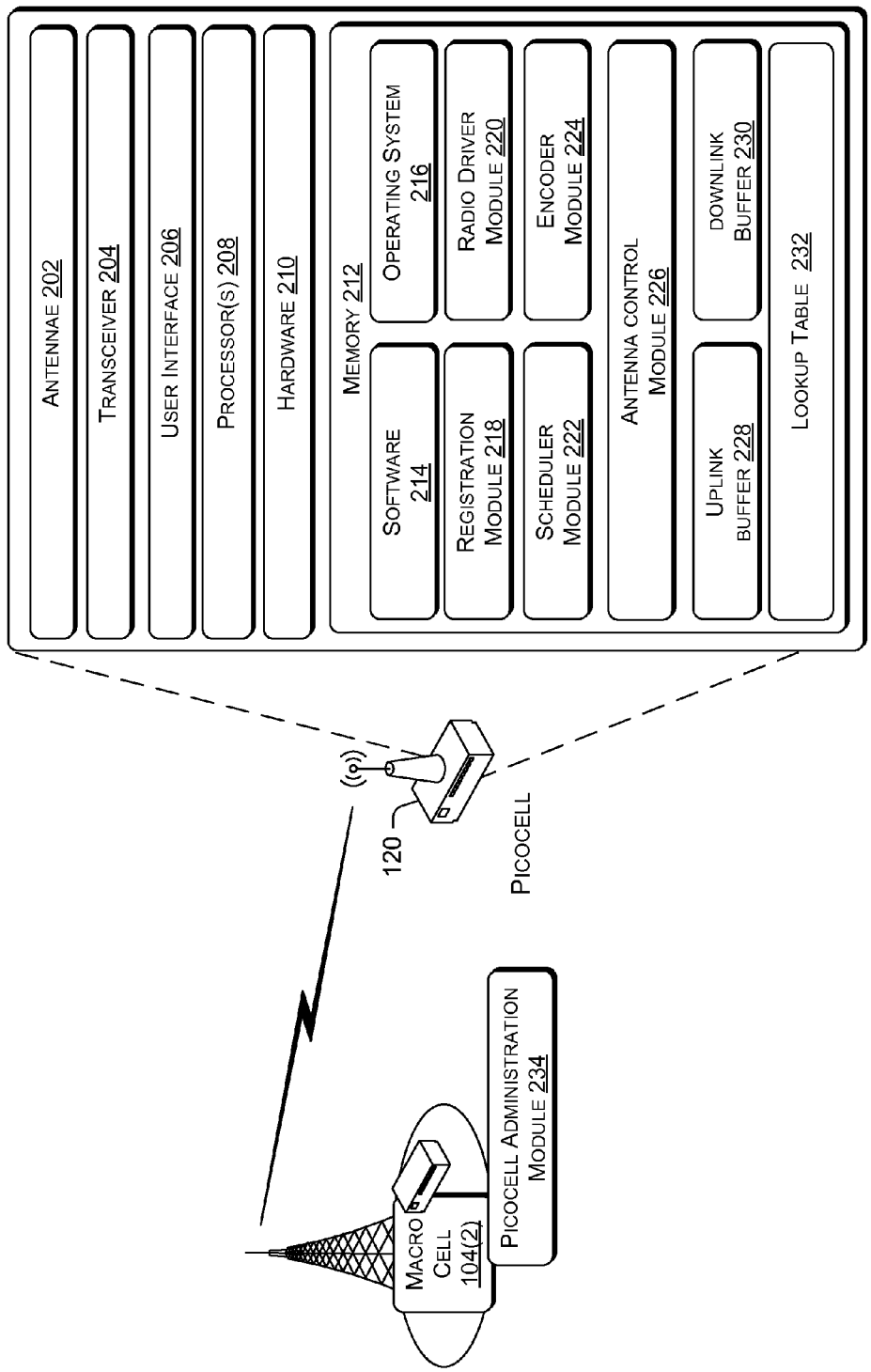
FIG. 2 is a block diagram showing various components of an illustrative picocell that uses self-adjusting wireless in-band backhaul.

FIG. 2 is a block diagram showing various components of an illustrative picocell 120 that uses a self-adjusting wireless in-band backhaul. The picocell 120 may include one or more antennae 202, transceiver 204, user interface 206, one or more processors 208, hardware 210, and memory 212.

In some embodiments, the antennae 202 may include an uplink antenna that sends radio signals to a macrocell, and a downlink antenna that receives radio signals from a macrocell. In other embodiments, a single antenna may both send and receive radio signals. The one or more antennae 202 may include an array of antenna elements. Each of the antenna elements may be a directional antenna element that is configured to receive RF signals from a particular direction. In some instances, the antenna elements may be steered mechanically to orient in different directions. For example, the antennae 202 may include a planar antenna with multiple antenna elements. The planar antenna may be equipped with servo motors that orient or reorient the planar antenna.

In other instances, the antenna elements of the antennae 202 may be phase shifted via an electrical signal such that signal reception and/or transmission by the antennae 202 is beam formed, e.g., reinforced in a specific direction and suppressed in other directions. Accordingly, the phase shifting of the antenna may orient or reorient the antenna 202 without physically moving the antenna 202. In additional embodiments, the antennae 202 may include a directional antenna of other directional designs, so long as the directional antenna may be oriented in a specified direction. For example, the antennae 202 may include a Yagi antenna, a horn antenna, a dish reflector antenna, a slot antenna, a waveguide antenna, a Vivaldi antenna, a helix antenna, a planar antenna, a dipole array antenna, an origami antenna, etc.

The transceiver 204 may include radios that receive communication signals and transmit communication signals. In various embodiments, the radio that transmits communication signals may adjust the power output based on commands from the radio driver module 220. For example, the radio driver module 220 boost the power output of the radio due to signal interference from other radio signals. The radio that receives communication signals may include software and hardware components that perform signal filtering based on the instructions of the radio driver module 220 in order to suppress interference signals and background noise. In this way, the radio may increase the signal fidelity and/or quality of the received communication signals.

The user interface 206 may enable a user to provide inputs and receive outputs from the picocell 120. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

Each of the processors 208 may be a single-core processor, a multi-core processor, a complex instruction set computing (CISC) processor, or another type of processor. The hardware 210 may include a power source and digital signal processors (DSPs), which may include single-core or multiple-core processors. The processors may perform operation in parallel to process a continuous stream of data. The hardware 210 may also include network processors that manage high speed communication interfaces, including communication interfaces that interact with peripheral components. The network processors and the peripheral components may be linked by switching fabric. The hardware 210 may further include hardware decoders and encoders, an antenna interface controller, a network interface controller, and/or a universal serial bus (USB) controller. The antenna interface controller may be used by the processors to transmit and receive data through radio waves. In various embodiments, the antenna interface controller may support EDGE, W-CDMA, HSPA, LTE, CDMA-2000 network communication modes.

The network interface controller may enable the processors to transmit and receive data via a wired or a wireless computer network connection. In some embodiments, the hardware 210 may also include a direct memory access (DMA) engine. The DMA engine may enable the various controllers to access the memory 212 independently of the one or more processors 208 to perform tasks. The various controllers and processors of may execute instructions and perform tasks under the direction of software components that are stored in the memory 212.

The memory 212 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The memory 212 may store various software components that are executable or accessible by the processors and controllers of the picocell 120. The various components may include software 214, an operating system 216, a registration module 218, a radio driver module 220, a scheduler module 222, an encoder module 224, and an antenna controller module 226. Each module may include routines, program instructions, objects, and/or data structures that perform particular tasks or implement particular abstract data types. The memory 212 may further implement an uplink buffer 228, a downlink buffer 230, and a lookup table 232.

The software 214 may enable the picocell 120 to perform functions and control hardware components of the picocell 120. In various embodiments, the software 214 may include algorithms that support the sending uplink data to the core network 106. The algorithms may further support the receiving of downlink data from the core network 106. The uplink and downlink data may originated from and destined for user devices that are connect to the picocell 120, such as the user devices 108(1)-108(3). The algorithms may perform tasks such as channel decoding/encoding, uplink/downlink processing, computation of Fourier transforms, matrix inversions, Viterbi encoding and decoding, and/or signal convolution and filtering.

The operating system 216 may include components that enable the picocell 120 to receive and transmit data via various interfaces (e.g., user interface 206, communication interfaces, etc.). The operating system 216 may also process data using the one or more processors 208 to generate outputs based on inputs that are received via the user interface 206. For example, the operating system 216 may provide an execution environment for the execution of the software 214 and other software applications. The operating system 216 may include an output component that presents the output (e.g., display the data on an electronic display, store the data in memory, transmit the data to another electronic device, etc.). Additionally, the operating system 216 may include other components that perform various other functions generally associated with an operating system.

The registration module 218 may register the picocell 120 with a macrocell, such as the macrocell 104(2). During registration, the picocell 120 may authenticate to a picocell administration module 234 on the macrocell 104(2). In various embodiments, the authentication may be performed via a device identifier, an authentication token, an encrypted or hashed authentication secret, an authentication certificate, and/or other authentication mechanisms. In some instances, the picocell administration module 234 may permit the picocell 120 to register if the number of picocells that are currently registered with the macrocell 104(2) has not reached a predetermined threshold. This may ensure that the macrocell 104(2) is not overwhelmed with providing wireless in-band backhauls to an excessive number of the picocells.

Upon registration, the macrocell 104(2) may permit the picocell 120 to exchange data with the macrocell 104(2) via the use of a portion of the physical resource blocks. For example, the macrocell 104(2) may reserve a predetermined amount of the physical resource blocks for use as the wireless in-band backhaul by the picocell 120. However, because the wireless in-band backhaul is formed from a limited amount of physical resource blocks, the macrocell 104(2) still retains the ability to provide communication links to additional user devices (e.g., mobile phones, tablet computers, etc.) via the remaining physical resource blocks. Additionally, the macrocell 104(2) may also provide the picocell 120 with access to other privileges and information upon registration. The privileges may include an ability to request the use of physical resource blocks from the macrocell 104(2), as well as an ability to request that the macrocell 104(2) deallocate physical resource blocks to the picocell 120 prior to the picocell 120 disconnecting from the macrocell 104(2).

The information provided by the macrocell 104(2) to the picocell 120 may include characteristic of the communication uplink to the macrocell 104(2). For example, the characteristic may be a signal strength or a signal quality. Signal strength may be measured via received signal strength indicator (RSSI), reference signal received power (RSRP), received channel power indicator (RCPI), or other measurements. Signal quality may be measured through energy to interface ratio (ECIO), reference signal received quality (RSRQ), signal to interference-plus-noise ratio (SINR), or other measurements. The picocell 120 may use the information to orient or re-orient an antenna of the picocell 120 to optimize the communication link between the picocell 120 and the macrocell 104(2).

The implementation of the picocell administration module 234 on the macrocell 104(2) is a type of configuration change to the macrocell. Generally speaking, the configuration of a macrocell may be modified in multiple ways. The first way is a configuration change to the existing software oft the macrocell. A second way is a modification to the software of the macrocell, and the third way is a hardware change to the macrocell. While a software configuration change or a software modification is relatively easy to implement across a group of macrocells that are deployed in the field, hardware change to the macrocells are considerable harder to implement. This is because software configuration change or software modification may be implemented via remote update through a network, while the implementation of hardware change to the group of macrocells involves site visits and physical replacement of hardware components. Thus, the implementation of a picocell administration module on individual macrocells is relative easy as it is a form of software modification.

The radio driver module 220 may store uplink data of communication sessions that are received from user devices that connect to the picocell 120. In various embodiments, the uplink data of communication sessions may be received via physical resource blocks through the transceiver 204 of the picocell 120. The uplink data of each communication session may be stored by the radio driver module 220 according into a corresponding portion of an uplink buffer 228. The uplink data received from a user device may be a part of a voice call or data communication that involves the user device. The radio driver module 220 may store the uplink data of an existing communication session into a corresponding buffer portion according to an association of a caller identifier of a user device participating in the communication session to a session identifier of the communication session. The session identifier of an existing communication session may be embedded in each of the physical resource blocks that make up the uplink data of the communication session. Alternatively, if the uplink data is a request to establish a new communication session, the radio driver module 220 may store the uplink data in a newly assigned buffer portion of the uplink buffer 228.

Further, the radio driver module 220 may receive downlink physical resource blocks and a control channel that are transmitted by the macrocell 104(2). For example, the control channel may be a Physical Downlink Control Channel (PDCCH) or another equivalent control channel. Once the physical resource blocks and the control channel are received, the radio driver module 220 may use session identifier information for the downlink data as embedded in the control channel to identify downlink data for communication sessions that are handled by the picocell 120. Thus, any downlink data not intended for communication sessions that are handled the picocell 120 may be filtered out. Subsequently, the radio driver module 220 may use the session identifier information in the lookup table 232 to extract individual downlink data that belong to the communication session of each user device connected to the picocell 120. In various embodiments, the lookup table 232 may contain entries, in which each entry shows an association between a caller identifier of a user device and a session identifier of a communication session. Thus, the radio driver module 220 may use a session identifier belonging to each portion of the downlink data and the association entries to determine the corresponding caller identifier, and in essence the user device, for each portion of the downlink data.

Accordingly, the radio driver module 220 may store the downlink data that belong to each of such user devices in a corresponding buffer portion of the downlink buffer 230. In some instances, the extraction of the downlink data may further involve the filtering out of downlink data that belong to communication sessions of user devices that are directly connected to the macrocell 104(2).

The scheduler module 222 may review the uplink data that is received from a user device connected to the picocell 120 and placed in the uplink buffer 228. In some instances, the uplink data that is received from a user device may encapsulates a request of a user device, such as the user device 108(1), to establish a new communication session. The new session request may include request metadata, such as a caller identifier and a callee identifier. In various embodiments, the caller identifier may be a Mobile Station International Subscriber Directory Number (MSISDN) a Mobile Identification Number (MIN), or an International Mobile Subscriber Identity (IMSI). For voice calls, the callee identifier may be a Mobile Station International Subscriber Directory Number (MSISDN) a Mobile Identification Number (MIN), or an International Mobile Subscriber Identity (IMSI) associated with a recipient user device. For data communication, the callee identifier may be an internet protocol (IP address) of a server, a domain name, or a Uniform Resource Locator (URL). In such instances, the scheduler module 222 may extract a caller identifier from the uplink data and generate a session identifier for the newly requested communication session. Subsequently, the scheduler module 222 may create an entry in the lookup table 232 that associates the caller identifier with a session identifier. Following the creation of the entry in the lookup table 232, the scheduler module 222 may activate the encoder module 224 to transmit the uplink data of the new session request to the macrocell 104(2) via physical resource blocks. In turn, the macrocell 104(2) may extract data packets containing the new session request from the received uplink data. The macrocell 104(2) may further transmit the data packets that contain the new session request to the core network 106 via the backhaul 116.

In response, the scheduler module 222 may receive an acknowledgement of the new session request from the core network 106. For example, the new session request may be received by the SGSN of the core network 106. The SGSN may authenticate the new session request via a home registry, such as a Home Location Register (HLR) for a 3G carrier network, or a Home Subscriber Server (HSS) for a 4G carrier network. Alternatively, the SGSN may authenticate the new session request against a visitor registry, such as a Visitor Location Register (VLR) for a 3G carrier network, or a Visitor Subscriber Server (VSS) for a 4G carrier network. Upon authentication, the SGSN may route the new session request to the appropriate recipient. For instance, if the recipient of the request is another user device, the SGSN may route the new session request to the user device. However, if the recipient of the request is a land line recipient device, the SGSN may route the new session request to the Mobile Switching Center (MSC) of the core network 106. Further, if the recipient of the request is to a data provider, the SGSN may route the new session request to the GGSN of the core network 106.

The completion of such routing may result in the SGSN receiving an acknowledgement message from the appropriate party. The acknowledgement message may indicate that a new communication session has been established for the new session request. In turn, the SGSN may code the acknowledgment message into IP data packets for delivery to the macrocell 104(2). The macrocell 104(2) may encapsulate the IP data packets into physical resource blocks as downlink data for delivery to the picocell 120 via the wireless in-band backhaul 124. The physical resource blocks may be described in a control channel that is encoded by the macrocell 104(2) and transmitted to the picocell 120. The control channel may contain a session identifier (which had belonged to the new session request) that indicates that the downlink data is for the new communication session.

Accordingly, the radio driver module 220 of the picocell 120 may use session identifier as embedded in the control channel to extract the physical resource blocks that contains the acknowledgement message for the new communication session. Subsequently, the radio driver module 220 may use the lookup table 232 to determine that the session identifier of the new communication session is associated with the caller identifier of the user device 108(1). Accordingly, the radio driver module 220 may store the downlink data in the physical resource blocks into a portion of the downlink buffer 230 that corresponds to the user device 108(1) for access by the scheduler module 222. In turn, the scheduler module 222 may activate the encoder module 224 to encode the downlink data containing the acknowledgement message for transmission to the user device 108(1). However, in instances in which no acknowledgment message is received by the scheduler module 222 in response to a new session request, the scheduler module 222 may delete the session identifier that is assigned to the newly requested communication session and the associated caller identifier of the user device 108(1) for the lookup table 232. Further, the scheduler module 222 may also initiate a deallocation request to the macrocell 104(2), such that the macrocell 104(2) may deallocate the physical resource blocks that were reserved for use by the picocell 120.

In other instances, the uplink data that is received from a user device, such as the user device 108(1), may belong to a communication session that is already established. In such instances, the scheduler module 222 may review a volume of such uplink data to determine whether the macrocell 104(2) has reserved a sufficient amount of physical resource blocks to transfer the volume of the uplink data to the macrocell 104(2). Thus, if the scheduler module 222 determine that there is an insufficient amount of reserved physical resource blocks, the scheduler module 222 may transmit a request for additional physical resources blocks as desired in order to perform the transfer. In turn, the request for additional physical resource blocks may be received by the picocell administration module 234 of the macrocell 104(2). The picocell administration module 234 may make a one-time grant of the additional physical resource blocks up to a limit established for each allocation of physical resource blocks to picocells. Subsequently, the scheduler module 222 may activate the encoder module 224 to transmit the uplink data of the communication session to the macrocell 104(2) via the physical resource blocks.

Furthermore, the scheduler module 222 may review the downlink data of each communication session that is stored in the downlink buffer 230 and perform actions based on stored policies. For example, if the downlink data of a particular communication session indicates that the particular communication session is to be terminated, the scheduler module 222 may delete a corresponding entry from the lookup table 232. Further, the scheduler module 222 may also initiate a deallocation request to the macrocell 104(2), such that the macrocell 104(2) may deallocate the physical resource blocks that were reserved for use by the picocell 120.

In another example, the scheduler module 222 may delete a corresponding entry from the lookup table 232 if circumstances indicate that the particular communication session is unauthorized. The particular communication session may be unauthorized if subscriber payment data for a user device that is engaged in a communication session shows that the associated subscriber is not up-to-date on payment. In such circumstances, the scheduler module 222 may further send a notification to the core network 106 via the wireless in-band backhaul 124, such that the billing subsystem may take action with respect to the subscriber. For example, the billing subsystem may send an electronic notice to the subscriber with respect to the lack of payment, start a collection process, or perform other loss prevention actions. Otherwise, the scheduler module 222 may activate the encoder module 224 to transmit the downlink data of a communication session to a user device having a caller identifier that is associated with a session identifier of the communication session.

The encoder module 224 may pack the uplink data of a communication session into the physical resource blocks that are reserved by the macrocell 104(2) for the uplink data of the communication session. Further, the encoder module 224 may encode the session identifier of the communication session for locating the corresponding uplink data into a control channel. The physical resource blocks, which form the wireless in-band backhaul, and the control channel are then transmitted to the macrocell 104(2) by the transceiver 204 under the direction of the encoder module 224. Accordingly, the macrocell 104(2) may use the session identifier information in the control channel to locate the uplink data that corresponds to the communication session.

Subsequently, the macrocell 104(2) may extract the uplink data and encode the uplink data into IP data packets for transmission over the backhaul 116 to the core network 106. Thus, as described above, if the IP data packets encapsulate a communication session request, the communication session request may be received by the SGSN of at the core network 106. Otherwise, if the IP packets encapsulate voice or data communication, the SGSN at the core network 106 may perform a routing action based upon the nature of the communication. For instance, if the IP packets encapsulates voice communication to another device, the SGSN may route the voice communication to the MSC of the core network 106. However, if the IP packets encapsulate data communication, the SGSN may route IP packets to the GGSN of the core network 106.

Additionally, the encoder module 224 may route the downlink data of a communication session to a corresponding user device. In various embodiments, the downlink data may be packed by the encoder module 224 into specific physical resource blocks for transmission to the corresponding user device. The specific physical resource blocks may be simultaneously transmitted by the transceiver 204 along with other physical resource blocks that are intended for additional user devices as an integrated radio signal. The encoder module 224 may further encode the locations of the specific physical resource blocks for the corresponding user device in a control channel that is also broadcasted by the transceiver 204 to user devices. For example, the encoder module 224 may mark the location information for the physical resource blocks with the caller identifier of the corresponding user device. In this way, the corresponding user device may use the marked location information to locate and filter out the specific physical resource blocks from the integrated radio signal that is transmitted by the transceiver 204 of the picocell 120. In some embodiments, the control channel may be a PDCCH or another equivalent control channel.

The antenna control module 226 may monitor one or more characteristics of the wireless in-band backhaul 124. Accordingly, the antenna control module 226 may perform adjustments to an antenna 126 of the picocell 120. The adjustments may orient the antenna 126 in relation to the macrocell 104(2) to maximize the data carrying capabilities of the wireless in-band backhaul 124. The adjustment of the antenna 126 may be performed via electrical beam forming and/or via mechanical movements of one or more elements of the antenna 126.

In some embodiments, the antenna control module 226 may make an adjustment based on one or more detected characteristics the received downlink signal that is received from a macrocell, such as the macrocell 104(2). Alternatively or concurrently, the antenna control module 226 may make the adjustment based on information received from the macrocell. The information may include one or more signal characteristics of the uplink to the macrocell 104(2). In other words, the one or more signal characteristics of the signal that is transmitted by the picocell 120 to the macrocell 104(2). For example, a signal characteristic may be a signal strength or a signal quality.

The antenna control module 226 may periodically or continuously adjust one or more of the antennae 202 such that each of the one or more signal characteristics meets a corresponding minimal threshold. In some instances, the antenna control module 226 may adjust an uplink antenna independently of a downlink antenna. However, if the antenna control module 226 is unable to ensure that each signal characteristic or at least a minimal number of signal characteristics meets corresponding thresholds, the antenna control module 226 may take remedial action. In various instances, the remedial action may include gradually reducing the number of user devices that are connecting to the picocell 120 by causing the picocell 120 to refuse the communication connection requests of new user devices. For example, schedule module 222 of the picocell 120 may be commanded to stop sending new session requests to the core network 106.

Other remedial actions may include terminating a predetermined number of existing communication connections to user devices, terminating all existing communication connections to user devices and shut down the picocell, and/or notifying the core network 106 of its reduced signal carrying capability. In other in instances, the antenna control module 226 may be configured to wait for a predetermined amount of time before adjusting the antenna again and ascertaining whether the resultant highest capable characteristic of the wireless communication meets the minimal threshold. In such embodiments, the antenna control module 226 may perform such back off and re-adjustment for a predetermined amount of times to attempt to meet the minimal threshold before resorting to the other remedial actions.

Example Processes

FIGS. 3-7 present illustrative processes 300-700 for implementing a self-adjusting wireless in-band backhaul for a wireless carrier network. Each of the processes 300-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-1000 are described with reference to the network architecture 100 of FIG. 1.

Figure 3:
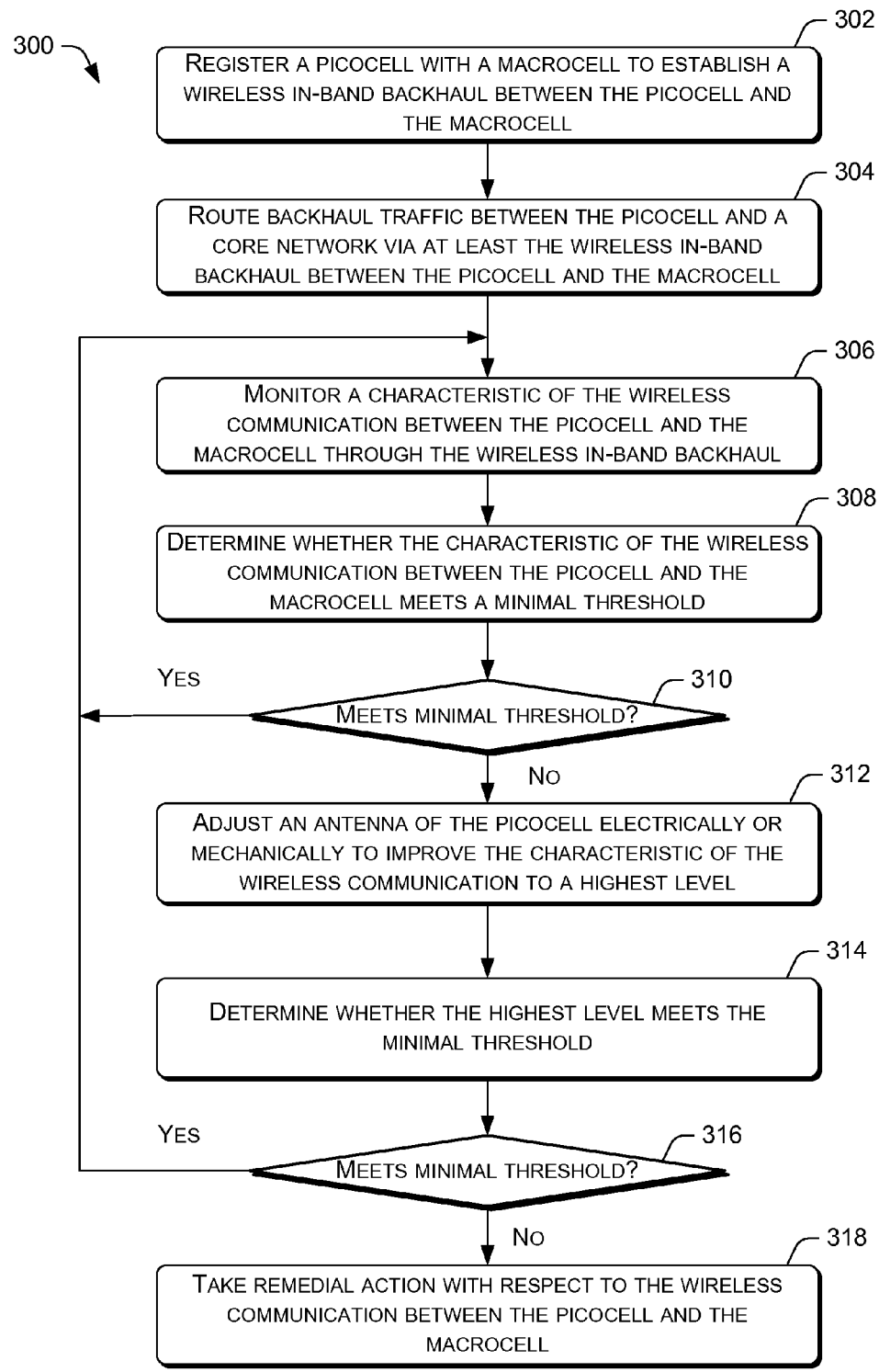
FIG. 3 is a flow diagram of an example process for adjusting an antenna of a picocell during the use of a wireless in-band backhaul between the picocell and a macrocell.

FIG. 3 is a flow diagram of an example process 300 for adjusting an antenna of a picocell during the use of a wireless in-band backhaul between the picocell and a macrocell. At block 302, the picocell 120 may register with a macrocell to establish a wireless in-band backhaul between the picocell and the macrocell. For example, the picocell 120 may register with the macrocell 104(2) to establish the wireless in-band backhaul 124. Upon registration, the macrocell 104(2) may permit the picocell 120 to exchange data with the macrocell 104(2) via the use of a portion of the physical resource blocks.

At block 304, the picocell 120 may route backhaul traffic between the picocell and the core network 106 via at least the wireless in-band backhaul between the picocell and the macrocell. In various embodiments, because the wireless in-band backhaul is formed from a limited amount of physical resource blocks, the macrocell still retains the ability to provide communication links to additional user devices (e.g., mobile phones, tablet computers, etc.) via the remaining physical resource blocks.

At block 306, the picocell 120 may monitor a characteristic of the wireless communication between the picocell and the macrocell through the wireless in-band backhaul. In some embodiments, the characteristic may be a signal strength or a signal quality of a downlink communication signal that is received by the picocell 120 from the macrocell. In other embodiments, the characteristic may be a signal strength or a signal quality of an uplink communication signal that transmitted by the picocell 120 to the macrocell.

At block 308, the picocell may determine whether the characteristics of the wireless communication between the picocell and the macrocell meets a minimal threshold. For example, if the characteristic is a signal strength, then the minimal threshold is a minimum signal strength threshold. Likewise, if the characteristics is a signal quality, then the minimal threshold is a minimum signal quality threshold. Thus, at decision block 310, if the picocell determines that the characteristic of the wireless communication does not meet the minimal threshold ("no" at decision block 310), the process 300 may proceed to block 312.

At block 312, the picocell may adjust an antenna of the picocell electrically or mechanically to improve the characteristic of the wireless communication to a highest level. For example, the antenna may be adjusted so that a downlink signal strength outputted by the macrocell and received by the picocell 120 is at a highest signal strength level. In another example, the antenna may be adjusted so that an uplink signal quality outputted by the picocell 120 and received by the macrocell is at a highest signal quality level. In various embodiments, the antenna may be the antenna 202 of the picocell 120. The antenna may be electrically adjusted via beam forming, or mechanically adjusted via the mechanical movements of one or more elements of the antenna.

At block 314, the picocell may determine whether the highest level after the adjustment meets the minimal threshold. Thus, at decision block 316, if the picocell determines that the highest level does not meet the minimal threshold ("no" at decision block 316), the process 300 may proceed to block 318.

At block 318, the picocell may take remedial action with respect to the wireless communication between the picocell and the macrocell. In some embodiments, the remedial action may include gradually reducing the number of user devices that are connecting to the picocell by causing the picocell to refuse the communication connection requests of new user devices. Other remedial actions may include terminating a predetermined number of existing communication connections to user devices, terminating all existing communication connections to user devices and shut down the picocell, and/or notifying the core network 106 of its reduced signal carrying capability.

In other embodiments, the picocell may be configured to wait for a predetermined amount of time before adjusting the antenna again and ascertaining whether the resultant highest capable characteristic of the wireless communication meets the minimal threshold. In such embodiments, the picocell may perform such back off and re-adjustment for a predetermined amount of times to attempt to meet the minimal threshold before resorting to the other remedial actions.

Returning to decision block 310, if the picocell determines that the characteristic of the wireless communication meets the minimal threshold ("yes" at decision block 310), the process 300 may loop back to block 306. Likewise, returning to decision block 316, if the picocell determines that the highest level meets the minimal threshold ("yes" at decision block 316), the process 300 may also loop back to block 306.

While the process 300 is described as determining whether a particular characteristic meets a minimal threshold, the process 300 may be modified in alternative embodiments to adjust the antenna such that each of multiple characteristics or at least a minimal number of the multiple characteristics meets corresponding thresholds in order to refrain from taking the remedial actions. Further, while the process 300 is described in the context of adjusting a single antenna, the process 300 may also be applied to the adjustment of multiple antennae. For example, the multiple antennae that are adjusted may include an uplink antenna and a downlink antenna.

Figure 4:
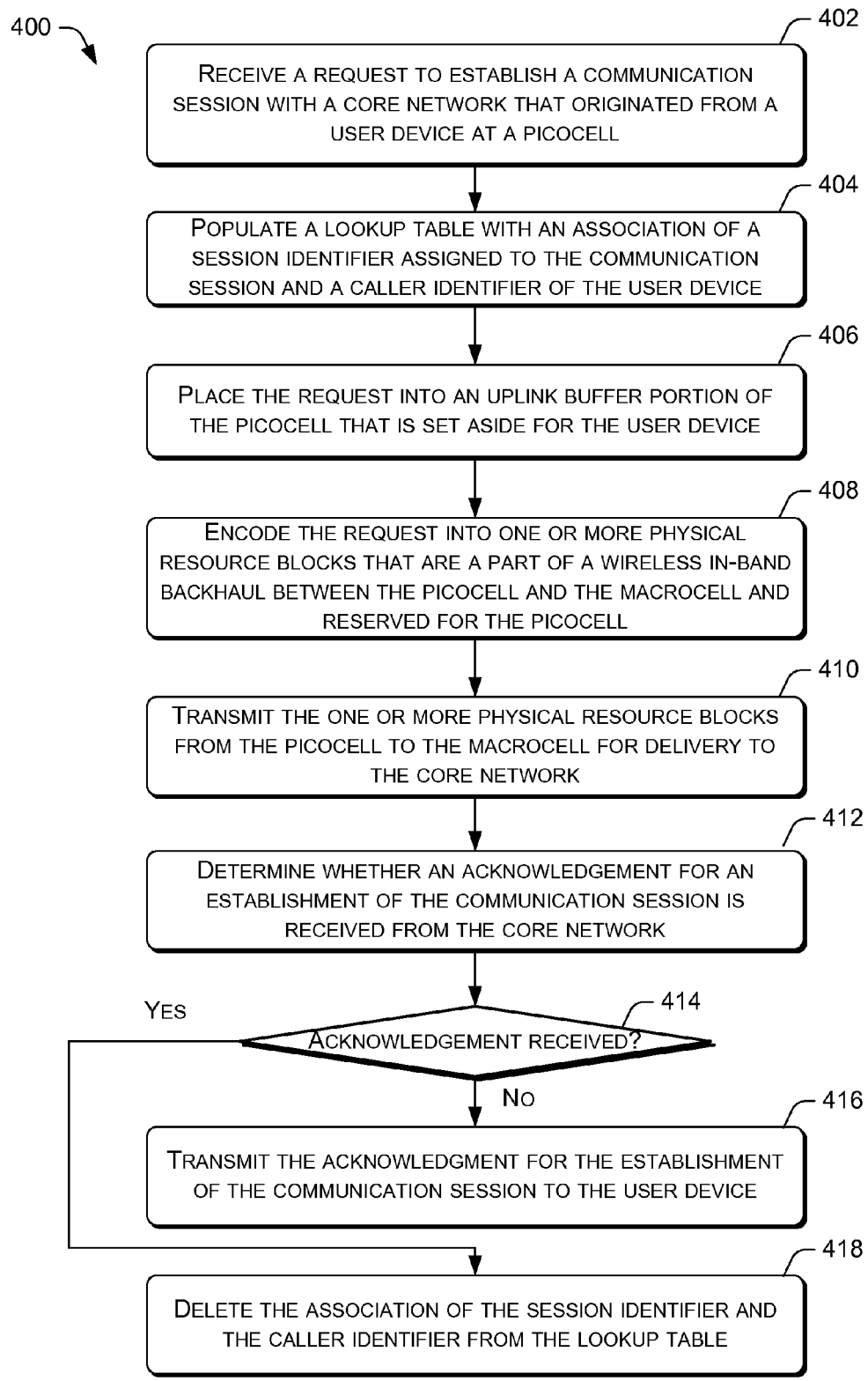
FIG. 4 is a flow diagram of an example process for establishing a communication session with a core network via a picocell that forms a wireless in-band backhaul with a macrocell to communicate with a core network.

FIG. 4 is a flow diagram of an example process 400 for establishing a communication session with a core network via a picocell that forms a wireless in-band backhaul with a macrocell to communicate with a core network. The process 400 may further illustrate aspects of the block 304 in the process 300. At block 402, the picocell 120 may receive a request to establish a communication session with the core network 106, in which the request originates from a user device, such as the user device 108(1). The new session request may include request metadata, such as a caller identifier that is associated with the user device. The request metadata may further include a callee identifier, which is the intended destination of the new communication session. The new session request may be transmitted to the picocell 120 via physical resource blocks of an air interface communication link between the user device and the picocell 120.

At block 404, the picocell 120 may populate the lookup table 232 with an entry that associates a session identifier that is newly assigned to the requested communication session and the caller identifier of the user device. At block 406, the picocell 120 may place the request for the new communication session into an uplink buffer portion of the picocell that is set aside for the user device.

At block 408, the picocell 120 may encode the request into one or more physical resource blocks that are reserved for the request for the new communication session. The physical resource blocks may be a part of the physical resource blocks that form the wireless in-band backhaul (e.g., the wireless in-band backhaul 124) between the picocell 120 and the macrocell, such as the macrocell 104(2).

At block 410, the picocell 120 may transmit the one or more physical resource blocks containing the request for the new communication session to the macrocell for eventual delivery of the request to the core network 106. For example, the use of the wireless in-band backhaul 124 to handle communication traffic between the picocell 120 and the macrocell 104(2) does not hinder the ability of the macrocell 104(2) to handle communication traffic from user devices that are directly connected to the macrocell 104(2). Further, the use of certain physical resource blocks of the wireless in-band backhaul 124 to send the communication session request from the picocell 120 to the macrocell 104(2) also does not preclude the picocell 120 from using other physical resource blocks to handle backhaul traffic for additional user devices.

At block 412, the picocell 120 may determine whether an acknowledgment of an establishment of the communication session is received from the core network 106. In various embodiments, the macrocell 104(2) may receive the acknowledgement from the core network 106 as IP data packets. In turn, the macrocell 104(2) may encapsulate the IP data packets into physical resource blocks as downlink data for delivery to the picocell 120 via the wireless in-band backhaul 124. The physical resource blocks may be described in a control channel that is encoded by the macrocell 104(2) and transmitted to the picocell 120. The control channel may contain a session identifier (which had belonged to the new session request) that indicates that the downlink data is for the new communication session.

Thus, at decision block 414, if the picocell 120 determines that the acknowledgement is received from the macrocell 104(2) ("yes" at decision block 414), the process 400 may proceed to block 416. At block 416, the picocell 120 may transmit the acknowledgement for the establishment of the communication session to the user device. In various embodiments, the acknowledgement may be packed by picocell 120 into specific physical resource blocks for transmission to the user device. The specific physical resource blocks may be simultaneously transmitted by the picocell 120 along with other physical resource blocks that are intended for additional user devices as an integrated radio signal. The picocell 120 may further encode the locations of the specific physical resource blocks for the user device in a control channel that is also broadcasted by the picocell 120. In this way, the user device may use the location information to locate and filter out the specific physical resource blocks that belong to the user device from the integrated radio signal.

However, returning to decision block 414, if the picocell 120 determines that the acknowledgement is not received from the macrocell 104(2) ("no" at decision block 414), the process 400 may proceed to block 418. At block 418, the picocell 120 may delete the entry that contains the association of the session identifier and the caller identifier of the user device from the lookup table 232.

Figure 5:
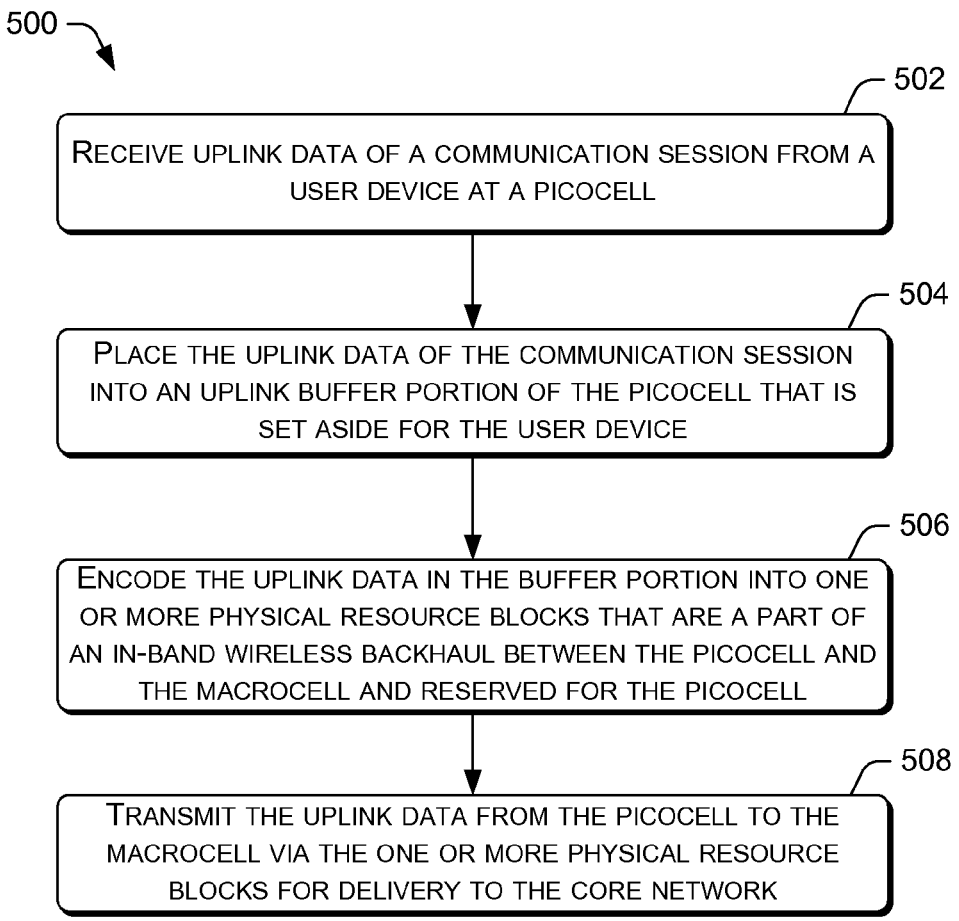
FIG. 5 is a flow diagram of an example process for transmitting uplink data destined for a core network via a wireless in-band backhaul between the picocell and the macrocell.

FIG. 5 is a flow diagram of an example process 500 for transmitting uplink data destined for a core network via a wireless in-band backhaul between the picocell and the macrocell. The process 500 may further illustrate aspects of the block 304 in the process 300. At block 502, the picocell 120 may receive uplink data of a communication session from a user device. In various embodiments, the uplink data may be transmitted to the picocell 120 via physical resource blocks of an air interface communication link between the user device and the picocell 120. The communication session may be established via the process 400 described in FIG. 4.

At block 504, the picocell 120 may place the uplink data of the communication session into a portion of the uplink buffer 228 of the picocell 120. The portion of the uplink buffer 228 may be set aside for the user device. At block 506, the picocell 120 may encode the uplink data in the portion of the uplink buffer 228 into one or more physical resource blocks. The one or more physical resource blocks may be a part of the wireless in-band backhaul 124 between the picocell 120 and the macrocell 104(2) that is reserved for the user device. At block 508, the picocell 120 may transmit the uplink data of the user device to the macrocell 104(2) via the one or more physical resource blocks that are a part of the wireless in-band backhaul 124 between the picocell 120 and the macrocell 104(2). The use of the wireless in-band backhaul 124 to handle communication traffic between the picocell 120 and the macrocell 104(2) does not hinder the ability of the macrocell 104(2) to handle communication traffic from user devices that are directly connected to the macrocell 104(2). Further, the use of certain physical resource blocks of the wireless in-band backhaul 124 to send the uplink data of the user device from the picocell 120 to the macrocell 104(2) also does not preclude the picocell 120 from using other physical resource blocks to handle backhaul traffic for additional user devices.

Figure 6:
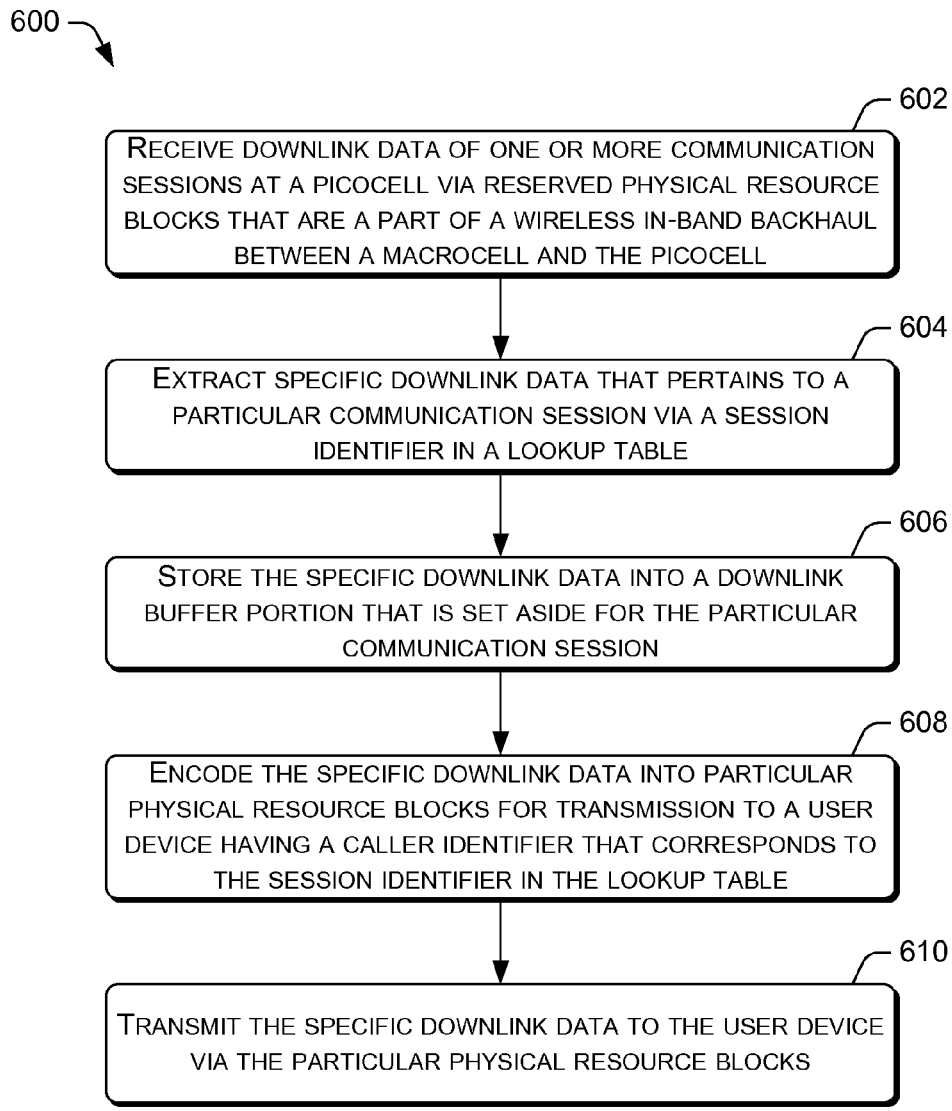
FIG. 6 is a flow diagram of an example process for receiving downlink data that originated from a core network at a picocell via a wireless in-band backhaul between the picocell and the macrocell.

FIG. 6 is a flow diagram of an example process 600 for receiving downlink data that originated from a core network at a picocell via a wireless in-band backhaul between the picocell and the macrocell. The process 600 may further illustrate aspects of the block 304 in the process 300. At block 602, the picocell 120 may receive downlink data of one or more communication sessions via reserved physical resource blocks that are a part of the wireless in-band backhaul that is between the picocell 120 and a macrocell. For example, the wireless in-band backhaul may be the wireless in-band backhaul 124 that is between picocell 120 and the macrocell 104(2). The use of the wireless in-band backhaul 124 to handle communication traffic between the picocell 120 and the macrocell 104(2) does not hinder the ability of the macrocell 104(2) to handle communication traffic from user devices that are directly connected to the macrocell 104(2).

At block 604, the picocell 120 may extract specific downlink data that pertains to a particular communication session via session identifier in the lookup table 232. In various embodiments, the picocell 120 may receive a control channel that accompanies the physical resource blocks from the macrocell 104(2). Accordingly, the picocell 120 may use session identifier information for the downlink data as embedded in the control channel to identify downlink data for communication sessions that are handled by the picocell 120. Thus, any downlink data not intended for the communication sessions that are handled by the picocell 120 may be filtered out. Subsequently, the radio driver module 220 may use the session identifier information in the lookup table 232 to extract the specific downlink data that belong to the particular communication session.

At block 606, the picocell 120 may store the specific downlink data into a downlink buffer portion that is set aside for the particular communication session. At block 608, the picocell 120 may encode the specific downlink data into particular physical resource blocks for transmission to a user device having a caller identifier that corresponds to the session identifier of the particular communication session in the lookup table 232.

At block 608, the picocell 120 may transmit the specific downlink data to the user device via the particular physical resource blocks. In various embodiments, the particular physical resource blocks may be simultaneously transmitted by picocell 120 along with other physical resource blocks that are intended for additional user devices as an integrated radio signal. The picocell 120 may further encode the locations of the particular physical resource blocks for the user device in a control channel that is also broadcasted by the picocell 120. In this way, the user device may use the location information to locate and filter out the particular physical resource blocks that belong to the user device from the integrated radio signal.

Figure 7:
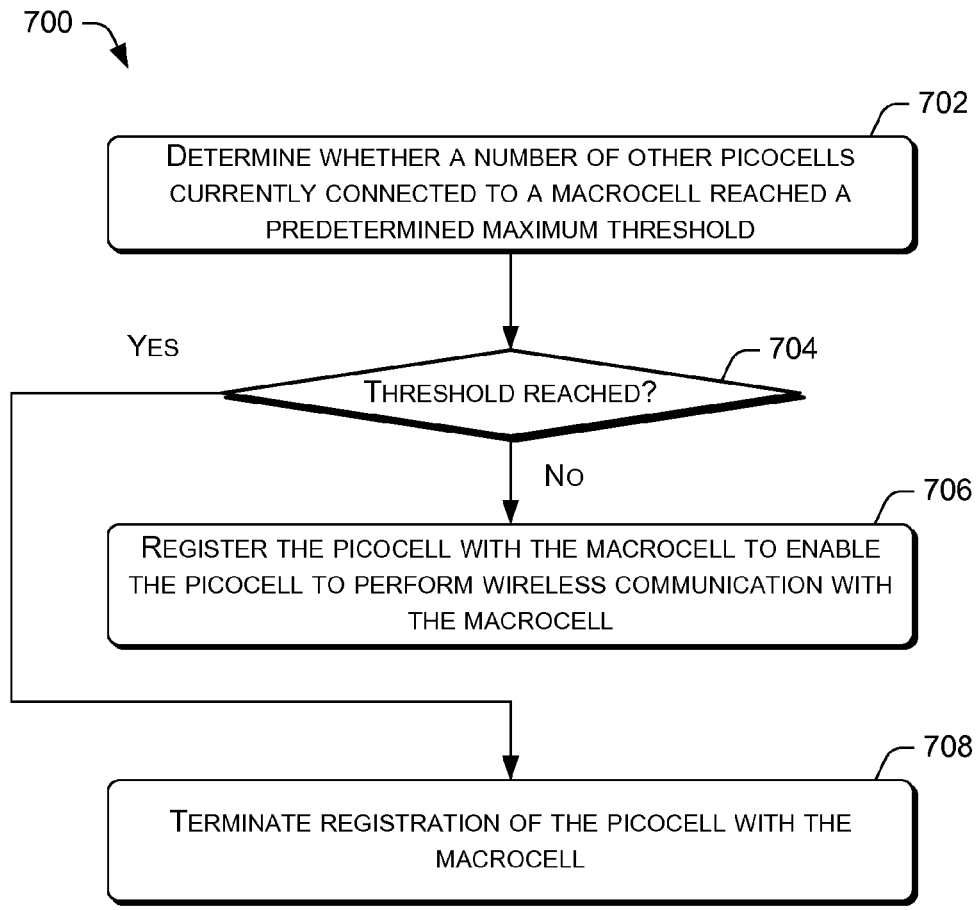
FIG. 7 is a flow diagram of an example process for selectively registering a picocell with a core network to route communication from the picocell to the core network via a wireless in-band backhaul between the picocell and the macrocell.

FIG. 7 is a flow diagram of an example process 700 for selectively registering a picocell with a core network to route communication from the picocell to the core network via a wireless in-band backhaul between the picocell and the macrocell. The process 700 may further illustrate aspects of the block 304 in the process 302.

At block 702, the picocell 120 may determine whether a number of other picocells that are currently connected to a macrocell, such as the macrocell 104(2), reached a predetermined maximum threshold. The picocell administration module 234 of the macrocell 104(2) may provide the number of other picocells that are currently connected with the macrocell to the picocell 120. Thus, at decision block 704, if the picocell 120 determines that the threshold is not reached ("no" at decision block 704), the process 700 may proceed to block 706.

At block 706, the picocell 120 may register with the macrocell to enable the picocell 120 to perform wireless communication with the macrocell. Upon registration, the macrocell may permit the picocell 120 to exchange data with the macrocell via the use of a portion of the physical resource blocks. For example, the macrocell may reserve a predetermined amount of the physical resource blocks for use as the wireless in-band backhaul by the picocell 120. However, because the wireless in-band backhaul is formed from a predetermined amount of physical resource blocks, the macrocell still retains the ability to provide communication links to additional user devices (e.g., mobile phones, tablet computers, etc.) via the remaining physical resource blocks.

However, returning to decision block 704, if the picocell 120 determines that the threshold is reached ("yes" at decision block 704), the process 700 may proceed to block 708. At block 708, the picocell 120 may terminate the registration with the macrocell. In alternative embodiments, the process 700 may be performed by a macrocell instead of a picocell. As the macrocell may permit the picocell 120 to register if the number of other picocells that are currently registered with the macrocell has not reached the threshold. Otherwise, the macrocell may refuse a request of the picocell 120 to register with the macrocell.

The techniques may enable a wireless telecommunication carrier to deploy picocells to isolated spaces such as the inside of buildings, basements, and other areas without having to provide dedicated backhaul connections between the picocells and the core network of the wireless telecommunication carrier. Thus, the use of the wireless in-band backhaul may enable the wireless telecommunication carrier to reduce the costs associated with the deployment, service, and maintenance of picocells. Further, while the techniques are illustrated as providing a self-adjusting wireless in-band backhaul for a picocell, the techniques may also be applicable to providing self-adjusting wireless in-band backhauls for other types of communication cells. For example, a macrocell as described in the embodiments herein may be substituted with a microcell or a picocell, and the picocell as described in the embodiments herein may be substituted with a microcell or a femtocell in other embodiments.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   determining, by a communication cell that is attempting to establish a wireless in-band backhaul with a macrocell, whether a number of other communication cells that are currently using wireless in-band backhauls with the macrocell has reached a predetermined maximum threshold;
   establishing, by the communication cell, the wireless in-band backhaul between the communication cell and the macrocell in response to the communication cell determining that the number of other communication cells that are currently connected to the macrocell using the wireless in-band backhauls is below the predetermined maximum threshold;
   routing backhaul traffic for one or more user devices between the communication cell and a core network of a carrier network via at least the wireless in-band backhaul between the communication cell and the macrocell, the wireless in-band backhaul taking place of a dedicated backhaul between the communication cell and the core network of the carrier network;
   adjusting an antenna of the communication cell electrically or mechanically to improve a characteristic of a wireless communication via the wireless in-band backhaul to a highest level in response to determining that the characteristic fails to meet a minimal threshold; and
   performing at least one of reducing a number of user devices that are connected to the communication cell or configuring the communication cell to refuse connection requests from additional user devices in response to determining that the highest level fails to meet the minimal threshold.

2. The computer-implemented method of claim 1, wherein the adjustment the antenna of the communication cell electrically includes performing a beam forming and the adjusting the antenna of the communication cell mechanically includes moving one or more antenna elements of the antenna.

3. The computer-implemented method of claim 1, wherein the communication cell is a picocell, a microcell, or a femtocell.

4. The computer-implemented method of claim 1, wherein the wireless in-band backhaul enables the communication cell to further route backhaul traffic for the one or more user devices between the communication cell and the core network via a macrocell backhaul that connects the macrocell to the core network.

5. The computer-implemented method of claim 1, wherein the routing the backhaul traffic includes:
   receiving a request to establish a communication session for delivery to the core network, the request originating from a user device that is connected to the communication cell;
   populating a lookup table stored in the communication cell with an association of a session identifier assigned to the communication session and a caller identifier of the user device;
   placing the request into an uplink buffer portion of the communication cell that is set aside for the user device;
   encoding the request into one or more physical resource blocks reserved for the communication cell by the macrocell, the physical resource blocks being a part of the wireless in-band backhaul between the communication cell and the macrocell; and transmitting the one or more physical resource blocks that include the request from the communication cell to the macrocell for delivery to the core network.

6. The computer-implemented method of claim 5, further comprising:
   determining whether an acknowledgement for an establishment of the communication session is received from the core network;
   transmitting the acknowledgment for the establishment of the communication session to the user device in response to receiving the acknowledgement from the core network; and
   deleting the association of the session identifier of the communication session to the caller identifier from the lookup table stored in communication cell in response to a lack of the acknowledgement from the core network.

7. The computer-implemented method of claim 5, wherein the request to establish the communication session is a session request that is destined for a mobile communication device, a landline communication device, or a data provider.

8. One or more non-transitory computer-readable media of a communication cell storing computer-executable instructions that upon execution cause one or more processors to perform acts comprising:
   determining, while attempting to establish a wireless in-band backhaul with a macrocell, whether a number of other communication cells that are currently using wireless in-band backhauls with the macrocell has reached a predetermined maximum threshold;
   establishing the wireless in-band backhaul between the communication cell and the macrocell in response to the communication cell determining that the number of other communication cells that are currently connected to the macrocell using the wireless in-band backhauls is below the predetermined maximum threshold;
   routing backhaul traffic for one or more user devices between the communication cell and a core network of a carrier network via at least the wireless in-band backhaul between the communication cell and the macrocell, the wireless in-band backhaul taking place of a dedicated backhaul between the communication cell and the core network of the carrier network;
   adjusting an antenna of the communication cell electrically or mechanically to improve a characteristic of a wireless communication via the wireless in-band backhaul to a highest level in response to determining that the characteristic fails to meet a minimal threshold; and
   performing at least one of reducing a number of user devices that are connected to the communication cell or configuring the communication cell to refuse connection requests from additional user devices in response to determining that the highest level fails to meet the minimal threshold.

9. The one or more non-transitory computer-readable media of claim 8, wherein the adjusting the antenna of the communication cell electrically includes performing a beam forming and the adjusting the antenna of the communication cell mechanically includes moving one or more antenna elements of the antenna.

10. The one or more non-transitory computer-readable media of claim 8, wherein the communication cell is a picocell, a microcell, or a femtocell.

11. The one or more non-transitory computer-readable media of claim 8, wherein the wireless in-band backhaul enables the communication cell to further route backhaul traffic for the one or more user devices between the communication cell and the core network via a macrocell backhaul that connects the macrocell to the core network.

12. The one or more non-transitory computer-readable media of claim 8, wherein the routing the backhaul traffic includes:
   receiving a request to establish a communication session for delivery to the core network, the request originating from a user device that is connected to the communication cell;
   populating a lookup table stored in the communication cell with an association of a session identifier assigned to the communication session and a caller identifier of the user device;
   placing the request into an uplink buffer portion of the communication cell that is set aside for the user device;
   encoding the request into one or more physical resource blocks reserved for the communication cell by the macrocell, the physical resource blocks being a part of the wireless in-band backhaul between the communication cell and the macrocell; and
   transmitting the one or more physical resource blocks that include the request from the communication cell to the macrocell for delivery to the core network.

13. The one or more non-transitory computer-readable media of claim 12, wherein the acts further comprise:
   determining whether an acknowledgement for an establishment of the communication session is received from the core network;
   transmitting the acknowledgment for the establishment of the communication session to the user device in response to receiving the acknowledgement from the core network; and
   deleting the association of the session identifier of the communication session to the caller identifier from the lookup table stored in communication cell in response to a lack of the acknowledgement from the core network.

14. The one or more non-transitory computer-readable media of claim 12, wherein the request to establish the communication session is a session request that is destined for a mobile communication device, a landline communication device, or a data provider.

15. A communication cell, comprising:
   one or more processors; and
   memory having instructions stored therein, the instructions, when executed by the one or more processors, cause the one or more processors to perform acts comprising:
      determining, while attempting to establish a wireless in-band backhaul with a macrocell, whether a number of other communication cells that are currently using wireless in-band backhauls with the macrocell has reached a predetermined maximum threshold;
      establishing the wireless in-band backhaul between the communication cell and the macrocell in response to the communication cell determining that the number of other communication cells that are currently connected to the macrocell using the wireless in-band backhauls is below the predetermined maximum threshold;
      routing backhaul traffic for one or more user devices between the communication cell and a core network of a carrier network via at least the wireless in-band backhaul between the communication cell and the macrocell, the wireless in-band backhaul taking place of a dedicated backhaul between the communication cell and the core network of the carrier network;

adjusting an antenna of the communication cell electrically or mechanically to improve a characteristic of a wireless communication via the wireless in-band backhaul to a highest level in response to determining that the characteristic fails to meet a minimal threshold; and performing at least one of reducing a number of user devices that are connected to the communication cell or configuring the communication cell to refuse connection requests from additional user devices in response to determining that the highest level fails to meet the minimal threshold.

16. The communication cell of claim 15, wherein the adjusting the antenna of the communication cell electrically includes performing a beam forming and the adjusting the antenna of the communication cell mechanically includes moving one or more antenna elements of the antenna.

17. The communication cell of claim 15, wherein the communication cell is a picocell, a microcell, or a femtocell.

18. The communication cell of claim 15, wherein the wireless in-band backhaul enables the communication cell to further route backhaul traffic for the one or more user devices between the communication cell and the core network via a macrocell backhaul that connects the macrocell to the core network.

19. The communication cell of claim 15, wherein the routing the backhaul traffic includes:

receiving a request to establish a communication session for delivery to the core network, the request originating from a user device that is connected to the communication cell;

populating a lookup table stored in the communication cell with an association of a session identifier assigned to the communication session and a caller identifier of the user device;

placing the request into an uplink buffer portion of the communication cell that is set aside for the user device;

encoding the request into one or more physical resource blocks reserved for the communication cell by the macrocell, the physical resource blocks being a part of the wireless in-band backhaul between the communication cell and the macrocell; and transmitting the one or more physical resource blocks that include the request from the communication cell to the macrocell for delivery to the core network.

20. The communication cell of claim 19, wherein the acts further comprise:

determining whether an acknowledgement for an establishment of the communication session is received from the core network;

transmitting the acknowledgment for the establishment of the communication session to the user device in response to receiving the acknowledgement from the core network; and deleting the association of the session identifier of the communication session to the caller identifier from the lookup table stored in communication cell in response to a lack of the acknowledgement from the core network.

* * * * *